United States Patent
Ledon et al.

(10) Patent No.: US 6,274,114 B1
(45) Date of Patent: Aug. 14, 2001

(54) PROCESS FOR ON-SITE PRODUCTION OF ULTRA-HIGH-PURITY HYDROGEN PEROXIDE FOR THE ELECTRONICS INDUSTRY

(75) Inventors: Henry Ledon, Versailles; Roger Guillard, Fontaine les Dijon; Alain Tabard, Dijon; Guy Royal, Le Breuil; Gregory Broeker, Eragny S/Oise, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/333,976

(22) Filed: Jun. 16, 1999

(30) Foreign Application Priority Data

Feb. 24, 1999 (FR) .................................... 99 02290

(51) Int. Cl.$^7$ ........................... C01B 15/022; C07F 15/06
(52) U.S. Cl. .................. 423/587; 205/432; 556/1; 556/138
(58) Field of Search ................... 423/587; 556/1, 556/138; 205/432

(56) References Cited

U.S. PATENT DOCUMENTS

| | | | | |
|---|---|---|---|---|
| 2,178,640 | * | 11/1939 | Michalek et al. ........... | 423/587 |
| 2,215,856 | * | 9/1940 | Pfleiderer ................... | 423/587 |
| 5,143,710 | * | 9/1992 | Sawyer et al. ............... | 423/581 |

FOREIGN PATENT DOCUMENTS

| | | | |
|---|---|---|---|
| 0 001 719 | 5/1979 | (EP) . | |
| 0 176 446 | 4/1986 | (EP) . | |
| 0 283 751 | 9/1988 | (EP) . | |
| 47304 | * 3/1982 | (JP) ................. | 423/587 |

* cited by examiner

Primary Examiner—Wayne Langel
(74) Attorney, Agent, or Firm—Burns, Doane, Swecker & Mathis, L.L.P.

(57) ABSTRACT

Process for preparing hydrogen peroxide, comprising the following steps:
 a) a step of reduction of dioxygen in acidic medium with a hydrophobic organometallic complex, and
 b) a step of separation of the oxidized organometallic complex resulting from step a) and of the hydrogen peroxide by liquid/liquid extraction.

11 Claims, 6 Drawing Sheets

PROCESS FOR ON-SITE PRODUCTION OF ULTRA-HIGH-PURITY HYDROGEN PEROXIDE FOR THE ELECTRONICS INDUSTRY

BACKGROUND OF THE INVENTION (i) Field of the Invention

The present patent application relates to a novel process for preparing hydrogen peroxide.

(ii) Description of the Related Art

The process most commonly used at the present time is a chemical process based on the oxidation of anthraquinone (Walton J. H., J. Am. Chem. Soc. (1932), 54, 3228; Filson G. W. et al., U.S. Pat. No. 2,059,569), which is commonly referred to as the "AO process". This synthesis is performed according to the following reaction scheme:

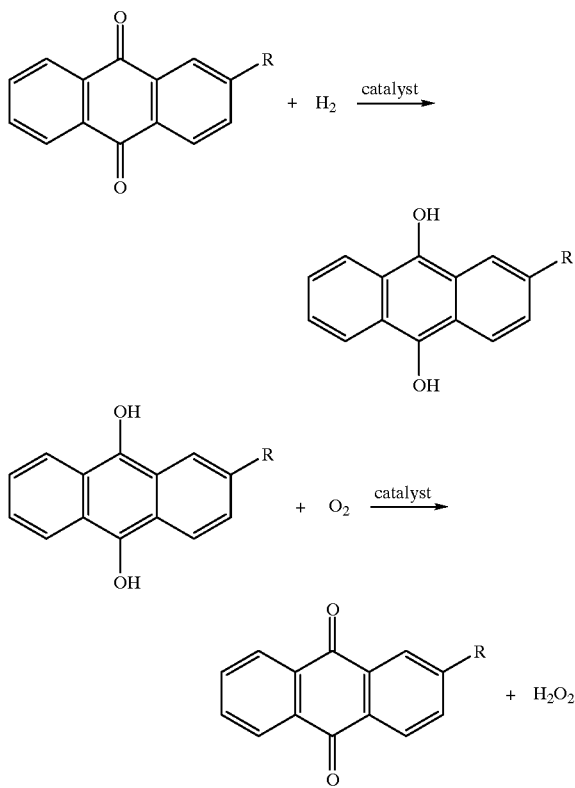

The solution of alkyl anthraquinone, generally 2-ethyl anthraquinone, is hydrogenated in the presence of a catalyst (Pd on $Al_2O_3$), in a water-immiscible organic solvent. The hydroquinone obtained is then oxidized by atmospheric dioxygen into a mixture of hydroxy hydroperoxides which are decomposed into hydrogen peroxide and the starting alkyl anthraquinone, which is recycled. The hydrogen peroxide formed is separated from the organic phase by extraction with water, it being possible for the $H_2O_2$ concentration to be up to 47% by weight; the aqueous solution is concentrated by distillation, in order to obtain the various commercial solutions. The main drawbacks of this method are associated with its hazards in the regeneration of the solution and the high running and maintenance costs of the process. Attempts have been made to replace the catalytic hydrogenation of anthraquinone with a chemical reduction on a sodium amalgam (Lynn S. et al., GB 1,154,096 and U.S. Pat. No. 3,351,104) or more recently by an electrochemical reduction (Keita B. et al., J. Electroanal. Chem. 1983, 145, 431–437; Schmidlin-Houissoud, A. Thesis from the University of Geneva 1997). However, none of these methods is industrially satisfactory.

Methods for producing hydrogen peroxide electrochemically are also known. The first of these is based on the electrolysis of sulphuric acid (Meindinger A., Ann. Chem. Pharm. Lieb. 1853, 88, 57; Bunsen R. W., Pogg. Ann. 1854, 91 621; Berthelot, M. C. R. 1878, 86, 71). Another method is based on the reduction of dioxygen with two electrons (Pascal P., in Nouveau traité de Chimie Minérale [Novel Treaty on Inorganic Chemistry]; Masson and Co.: 1960; Vol. Book XIII, 469–596; Tarasevich M. et al., in Comprehensive Treatise of Electrochemistry; Plenum Press: New York, 1983; Vol. 7; Divisek J. et al., J. Electroanal. Chem. 1975, 65, 603), either used in acidic medium (Damjanovic A. et al., J. Electrochem. Soc. 1967, 114, 466–472 and J. Electroanal. Chem. 1967, 15, 163–172; Genshaw M. A. et al., J. Electroanal. Chem. 1967, 15, 163–172; Taylor R. J. et al., J. Electroanal. Chem. 1975, 64, 85–94 and J. Electroanal. Chem. 1975, 64, 95–105; Otsuka K. et al., Electrochim. Acta 1990, 35, 319–322), or in basic medium (Paliteiro et al., J. Electroanal. Chem. 1987, 233, 147–159; Morcos I. et al., Electrochim. Acta 1970, 15, 953–975; Zhang Z. W. et al., Proc. Electrochem. Soc. 1984, 84, 158–178; Garten V. A. et al., Pure Appl. Chem. 1957, 7, 69–76; Kalu E. E. et al., J. Appl. Electrochem. 1990, 20, 932–940; Oloman C. et al., J. Appl. Electrochem. 1979, 9, 117–123; Stucki S. CH 4,455, 203 1984; Kornienko G. V. et al., Russian J. Appl. Chem. 1996, 69, 229–231; Tatapudi P. et al., J. Electrochem. Soc. 1993, 140, 55–57; Taylor R. J. et al., J. Electroanal. Chem. 1975, 64, 63–84). Although in basic medium most promising results were obtained, the instability of hydrogen peroxide (Duke F. R. J. Phys. Chem. 1961, 65, 304) and the delicate nature of its extraction did not allow the results observed in the laboratory to be transposed to the industrial scale. Lastly, although the production of hydrogen peroxide by electrocatalysis appears to be of increasingly high-quality performance, the fragility of the various electrodes used remains, at the present time, a poorly controlled parameter (Deronzier A. J., Chim. Phys. Phys.-Chim. Biol. 1996, 93, 611–619; Vork F. T. A., Electrochim. Acta 1990, 35, 135; Degrand C. J., Electroanal. Chem. 1984, 169 259–268; Grangaard D. H., U.S. Pat. No. 3,454,477, 1969; Kang C. et al., J. Electroanal. Chem. 1996, 413, 165–174). Given the increasing number of applications of hydrogen peroxide, in particular in the electronics industry, it is advantageous to be able to produce hydrogen peroxide directly at its site of use. However, on account of the high operating costs, the installation of a manufacturing unit working according to the anthraquinone process is not viable for annual production of less than twenty thousand tonnes and it moreover presents several major drawbacks, such as the degradation of the reaction medium and the problems of safety.

SUMMARY OF THE INVENTION

The Applicant has thus sought another process for manufacturing hydrogen peroxide which can be carried out on site, with low maintenance costs and leading to a hydrogen peroxide solution of high purity. It has found that a chemical process for producing hydrogen peroxide, using organometallic complexes, solves the problems mentioned above. Accordingly, a subject of the invention is a process for preparing hydrogen peroxide, comprising the following steps:

a) a step of reduction of dioxygen in acidic medium with a hydrophobic organometallic complex, and b) a step of separation of the oxidized organometallic complex resulting from step a) and of the hydrogen peroxide by liquid/liquid extraction.

Also provided is a plant for the production of hydrogen peroxide which can be used to practice the inventive methods.

DETAILED DESCRIPTION OF PREFERRED EMBODIMENT

Figure 1:
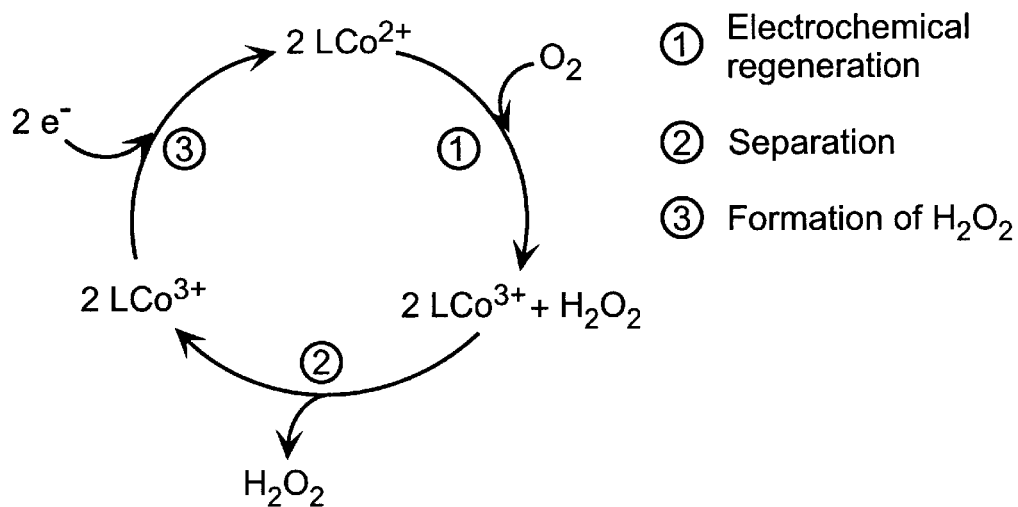
FIG. 1 illustrates a reaction cycle for a process in accordance with the invention.

The process for preparing hydrogen peroxide in accordance with the invention comprises the following steps:

a) a step of reduction of dioxygen in acidic medium with a hydrophobic organometallic complex, and b) a step of separation of the oxidized organometallic complex resulting from step a) and of the hydrogen peroxide by liquid/liquid extraction.

The implementation of step a) requires the use of organometallic complexes, the metal cation of which is capable of being oxidized, in acidic medium, into a metal cation having a higher oxidation state.

The implementation of step b) requires the use of hydrophobic complexes, whether they are intrinsically hydrophobic or whether they are afforded this nature by means of one or more lipophilic groups associated as counterions, or by means of one or more extracyclic substitutions. As non-limiting examples of counterions which give rise to the lipophilic nature of the organometallic complex, mention may be made of the tetraphenylborate anion or the hexadecylsulphonate anion.

According to a first specific embodiment of the present invention, the organometallic complex used in step a) is a cobalt complex in oxidation state (+II). In this case, the formation of hydrogen peroxide in step a) results from the activation of dioxygen by the cobalt ion of the organometallic complex used, according to the following reaction:

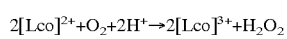

One molecule of dioxygen reacts, in acidic medium, with two molecules of active cobalt(+II) complex, to release one molecule of hydrogen peroxide and two molecules of cobalt complex in oxidation state (+III).

According to a second specific embodiment of the present invention, the organic ligand of the organometallic complex is a polyaza-macrocycle, and more particularly a polyazabicyclo[6.6.6]eicosane, such as, for example, 1,3,6,8,10,13,16,19-octaazabicyclo[6.6.6]eicosane (or sepulcrate) or the derivatives thereof mono- or polysubstituted on one of the atoms of the ring, or 3,6,10,13,16,19-hexaazabicyclo[6.6.6]eicosane, or the derivatives thereof mono- or polysubstituted on one of the atoms of the ring. As non-limiting examples of organometallic complexes, mention may be made of those described in the following publications: Sargeson A. M., Pure Appl. Chem. 1984, 56, 1603–1619; Bottomley G. A. et al., J. Chem. 1994, 47, 143–179; Geue R. J. et al., J. Am. Chem. Soc. 1984, 106, 5478–5488; Creaser I. I. et al., J. Am. Chem. Soc. 1984, 106, 5729–5731, and in particular the complexes of formulae (1), (2) and (3) below:

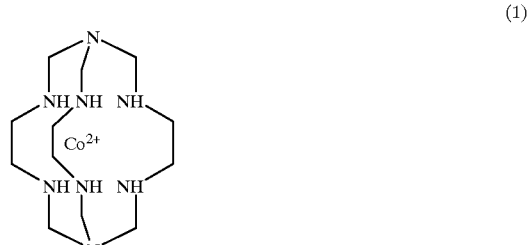

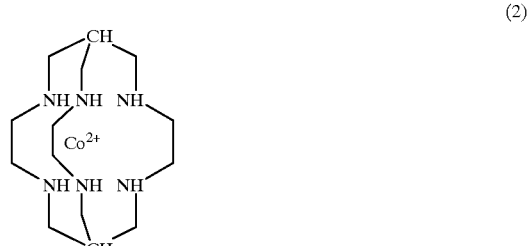

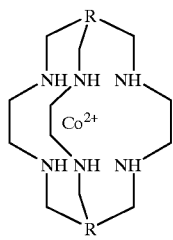

(3)

Mention may also be made of the following publications: Behm C. A. et al., J. Chem. Soc., Chem. Commun., 1993, 1844–1846 and Austr. J. Chem. 1995, 48, 1009–1030, in which sarcophagine complexes substituted with long carbon-based chains [compounds of formula (3)] are described.

According to one specific embodiment of the process which is the subject of the present invention, the cobalt(+III) complex resulting from steps a) and b) is reduced into a cobalt(+II) complex. The formation of the active cobalt(+II) complex can result from a reduction, either a chemical or an electrochemical reduction, of the cobalt complex in oxidation state (+III). According to a most specific embodiment of the process as described above, it thus comprises the following three steps:

a) a step of chemical production of hydrogen peroxide,
b) a step of separation of the hydrogen peroxide formed and of the oxidized complex, and
c) a step of regeneration of the active complex by electrochemical reduction, which is then reused in step a).

FIG. 1 illustrates the reaction cycle described above.

According to another aspect of the present invention, the subject thereof is a plant for the production of hydrogen peroxide, using the process as described above.

Figure 2:
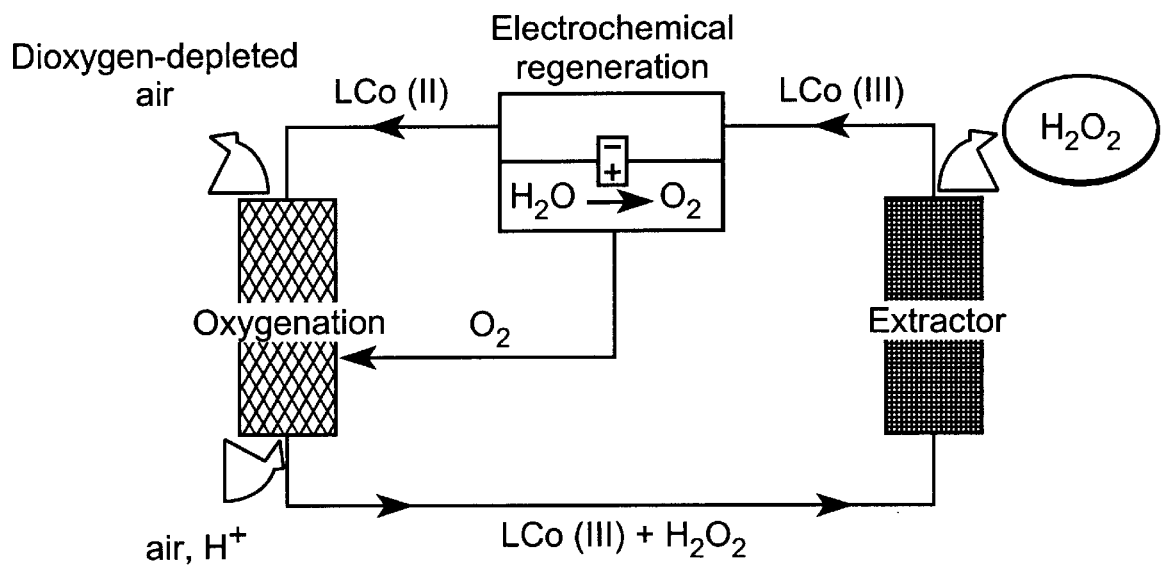
FIG. 2 illustrates a hydrogen peroxide generator.

FIG. 2 represents a hydrogen peroxide generator composed of 3 compartments:

an oxygenation compartment n which the reaction for the production of hydrogen peroxide is carried out,
an extraction compartment in which the hydrogen peroxide and the oxidized organometallic complex are separated, and
a regeneration compartment in which the electrochemical regeneration of the initial organometallic complex is carried out.

The reaction for the production of hydrogen peroxide takes place in the organic phase; the oxygen required for the reaction can be either pure oxygen or oxygen supplied by injecting air into the oxygenation compartment, which then allows the oxygen-depleted air resulting from the reaction to escape.

Figure 3:
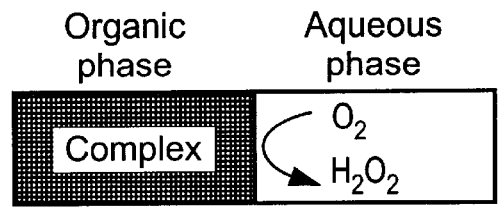
FIG. 3 illustrates phase separation in an extraction compartment.

The organic solvent, hydrogen peroxide and oxidized organometallic complex mixture is conveyed towards the extraction compartment, in which the hydrogen peroxide formed is separated in aqueous solution form by liquid/liquid extraction with an aqueous phase (FIG. 3).

Figure 4:
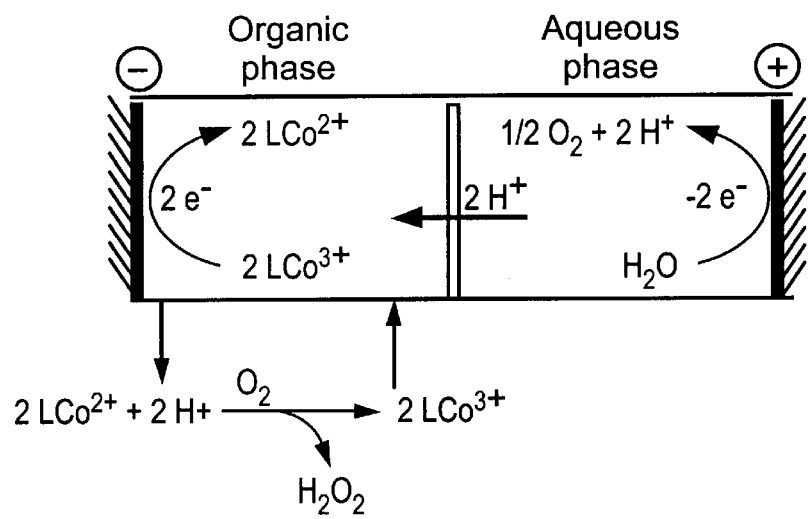
FIG. 4 illustrates the functioning of a regeneration compartment.

FIG. 4 illustrates the functioning of the regeneration compartment. After dissolving the cobalt(III) complex in a water-immiscible organic solvent, this complex is easily reduced electrochemically in the cathode compartment, while the anodic oxidation of water into dioxygen according to a four-electron process simultaneously allows the formation of the protons required for the subsequent reaction for the formation of hydrogen peroxide. Similarly, the oxygen formed can be used in addition in the oxygenation compartment or can be removed. The use of a cationic membrane such as Nafion™ selectively ensures migration of these protons from the anodic compartment to the cathodic compartment. After regeneration, the cobalt(II) complex is sent to the oxygenation compartment in order to participate in a new cycle.

A subject of the present invention is also a plant for the production of ultra-pure hydrogen peroxide, characterized in that it comprises, downstream of the hydrogen peroxide production unit as defined above, a hydrogen peroxide purification unit. Such a plant is illustrated in FIG. 14.

A subject of the invention is, more particularly, a plant as described above, comprising, downstream of the extraction compartment and upstream of the regeneration compartment, an inertizing compartment in which the organic medium containing the oxidized organometallic complex and oxygen is inertized by bubbling nitrogen through, and most particularly a plant, as defined above, characterized in that it is located at the site of use of the hydrogen peroxide solution thus produced and, if necessary, thus purified, and more particularly at a production site for electronic components.

Purification plants which may be mentioned, for example, are those using one of the processes described in international patent publications WO 98/54085, WO 98/54086, WO 98/54087 and WO 98/54088.

The examples which follow illustrate the invention without, however, limiting it.

A—Syntheses and Main Characteristics of the Complexes
A-1—Principle
a) [(Sep)Co]Cl$_3$ Complex The method of synthesis used is a modification of the one described in the following publications: Creaser I. I. et al., J. Am. Chem. Soc. 1977, 99, 3181–3182 and J. Am. Chem. Soc. 1982, 104, 6016–6025. Perchlorate ions are no longer used and the complex is purified without using an ion-exchange -resin. The complex is isolated by simple precipitation in ethanolic medium, in a yield of 79%. The compound Co(Sep)$^{3+}$ is thus synthesized very easily and in a large amount from the cobalt(III) triethylenediamine complex in the presence of aqueous ammonia and formaldehyde according to the following reaction:

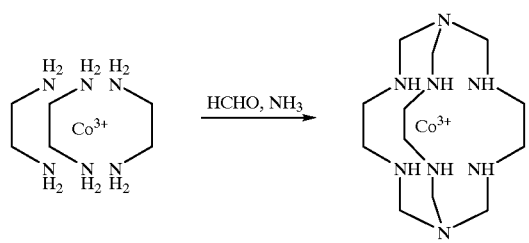

b) Synthesis of Lipophilic Complexes

Since the complex [(Sep)Co]Cl$_3$ is hydrophilic, it is necessary to make it totally insoluble in aqueous phase by chemical modification. The method used consists in exchanging the chloride anion of the complex [(Sep)Co]Cl$_3$ with a hydrophobic organic anion. Two types of counterion were used, the tetraphenylborate anion and the hexadecyl-sulphonate anion, leading, respectively, to the formation of the complexes [(Sep)Co][B(Ph)$_4$]$_3$ (4) and [(Sep)Co](C$_{16}$H$_{33}$SO$_3$)$_3$ (5), according to the following reaction scheme:

is filtered and the pH of the filtrate is then adjusted to 2 by adding concentrated hydrochloric acid. The solution is then diluted with 4 liters of ethanol, after which the mixture is maintained at 5° C. for 24 hours. After filtration, the precipitate obtained is dissolved in the minimum amount of water at 60° C. and 300 ml of acetone are then added rapidly

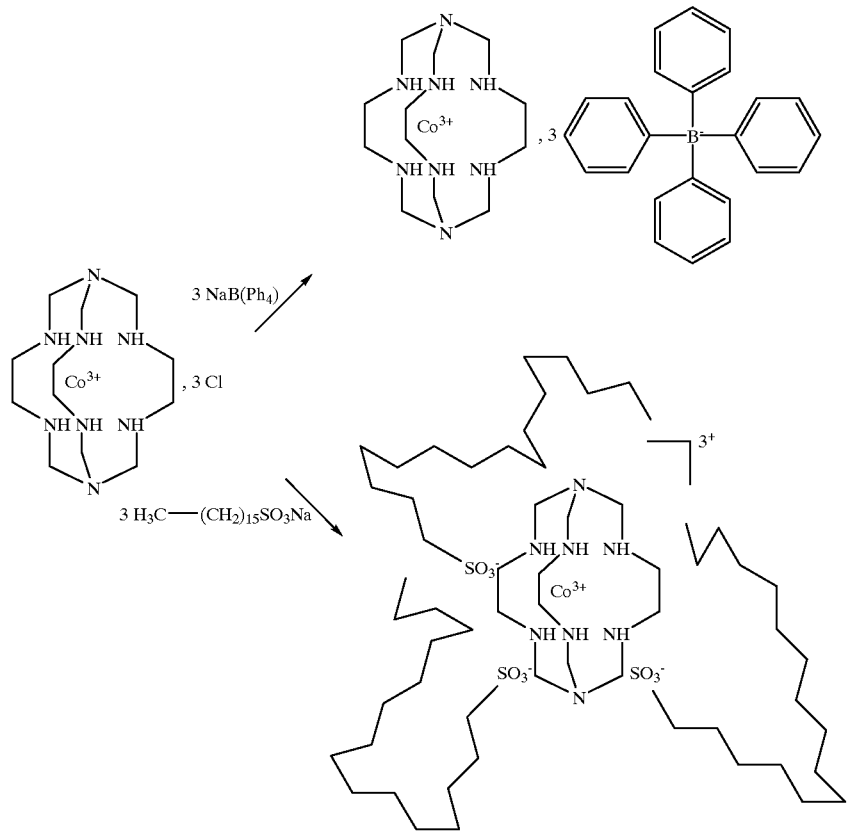

The exchange is carried out by dissolving the hydrophilic complex in water and then adding the desired anion, the lipophilic complex obtained being isolated by filtration.

A-2—Procedures a) Synthesis of (Sep)CoCl$_3$

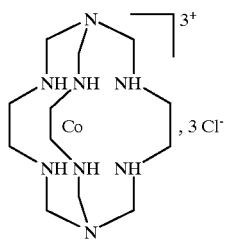

166 ml (2.5 mol) of aqueous ammonia (27% solution in water) diluted in 380 ml of water and 563 ml (7.5 mol) of formaldehyde (37% solution in water) are simultaneously added, dropwise, to a suspension containing 23 g (0.31 mol) of lithium carbonate and 18.2 g (0.05 mol) of triethylene-diaminecobalt(III) chloride complex in 125 ml of water. After stirring for 2 hours at room temperature, the mixture with vigorous stirring. The expected compound is isolated by filtration in a yield of 78% (m=17.6 g).

$^1$H NMR (D$_2$O) δ (ppm): 3.1 (m, 12 H, N—CH$_2$—CH$_2$—N); 4.0 (dd, 12 H, N—CH$_2$—N).

$^{13}$C NMR (D$_2$O) δ (ppm): 56.04; 69.63.

Elemental analysis for CoC$_{12}$H$_{30}$N$_8$Cl$_3$: Calculated: C% 31.9; H% 6.7; N% 24.8. Found: C% 31.6; H% 6.9; N% 24.7.

b) Synthesis of [(SepN-OH)Co]Cl$_3$

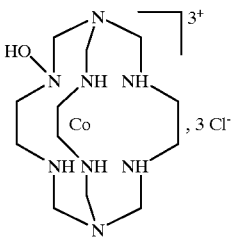

After dissolving 1.13 g (2.5 mmol) of [(Sep)Co]Cl$_3$ in 50 ml of water and then adding 2.5 ml of hydrogen peroxide at 35% in water, the pH is adjusted to 12.5 by adding concentrated potassium hydroxide solution. The solution, which has turned brown, is then stirred at room temperature for 3 hours, after which it is adsorbed on a cationic resin (Dowex 50X2-400). The product is then eluted by passing hydrochloric acid through (300 ml of 1 mol.l$^{-1}$ HCl and then 500 ml of 3 mol.l$^{-1}$ HCl). The solution obtained is then evaporated to dryness, under reduced pressure, and then taken up in 10 ml of water. The addition of 300 ml of acetone finally allows the precipitation of the expected compound, in the form of an orange-coloured powder. The yield is 56% (m=0.68 g). Large orange crystals can be obtained by recrystallizing the complex from perchloric acid solution (1 mol.l$^{-1}$).

c)—Synthesis of [(Sep)Co(III)] (B(C$_6$H$_5$)$_4$)$_3$ (4)

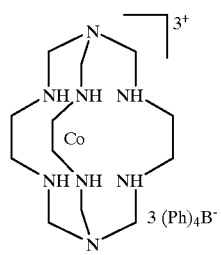

After dissolving 2 g (4.4 mmol) of Co(Sep)Cl$_3$ in 200 ml of water, a solution containing 20 g (0.58 mol) of sodium tetraphenylborate in 1.5 l of water is added dropwise away from light. The precipitate formed is then filtered off, washed with 3×30 ml of water and then dried under reduced pressure. The yellow lipophilic complex, obtained in a yield of 92% (m 4.1 g), is stored away from light and heat.

| Elemental analysis for CoC$_{60}$H$_{90}$N$_8$B$_3$ | | | |
|---|---|---|---|
| Calculated | C % 77.4 | H % 7.0 | N % 8.6 |
| Found | C % 77.1 | H % 7.1 | N % 8.5 | d)—Synthesis of [(Sep)Co(III)] (Cl$_6$H$_{33}$SO$_3$)$_3$ (5)

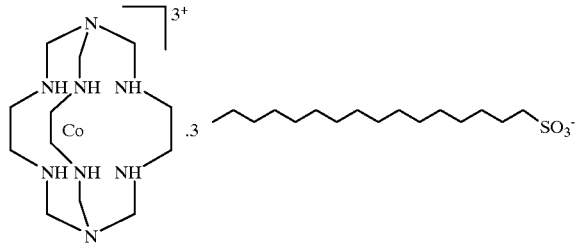

After dissolving 0.5 g (1.1 mmol) of [(Sep)Co]Cl$_3$ complex in 10 ml of water, 0.7 l of methanol containing 1.15 g (4.4 mmol) of 1-hexadecane-sulphonic acid is added rapidly. The solution is heated at 50° C. for 2 hours and then maintained at 4° C. for 24 hours. The expected complex is isolated by filtration and then dried under reduced pressure. The yield is 86% (m=1.20 g).

| Elemental analysis for CoC$_{60}$H$_{129}$N$_8$S$_3$O$_{10}$ | | | |
|---|---|---|---|
| Calculated | C % 57.1 | H % 10.3 | N % 8.9 | S % 7.6 |
| Found | C % 56.8 | H % 10.3 | N % 9.0 | S % 7.4 |

Figure 5:
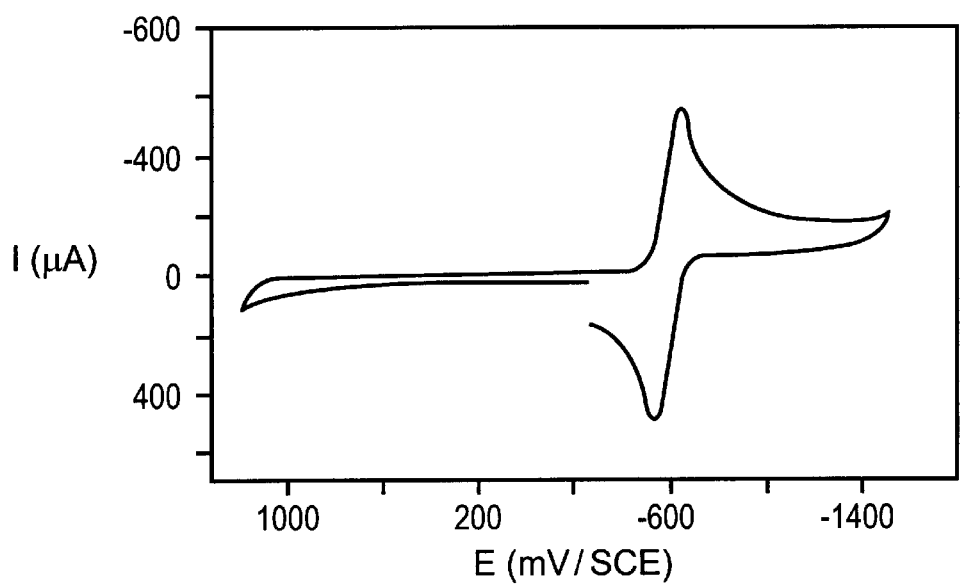
FIG. 5 illustrates a cyclic voltammogram of a $[(Sep)Co]^{3+}$ complex in KCl (0.1 mol.l$^{-1}$).

A-2—Electrochemical Characteristics a) The cyclic voltammogram of the [(Sep)Co]$^{3+}$ complex in KCl (0.1 mol.l$^{-1}$) is given in FIG. 5 (solvent: water +0.2 mol.l$^{-1}$ KCl; working electrode: glass carbon, v=100 mV.s$^{-1}$). It consists of a single reversible wave at -0.574 V, attributable to the redox of the [(Sep)Co]$^{3+}$/[(Sep)Co]$^{2+}$ couple. After several successive cycles, the intensity of the signals, the ratio $i_a/i_c$ of which is equal to 1, remains unchanged, showing that the [(Sep)Co]$^{3+}$/[(Sep)Co]$^{2+}$ couple is totally reversible. The nature of the anion associated with the complex and the pH of the solution have little influence on the electronic properties of the complex and have a very insignificant effect on the redox potential of the [(Sep)Co]$^{3+}$/[(Sep)Co]$^{2+}$ couple.

b) Stability of the Sepulchrate Complex

Figure 6:
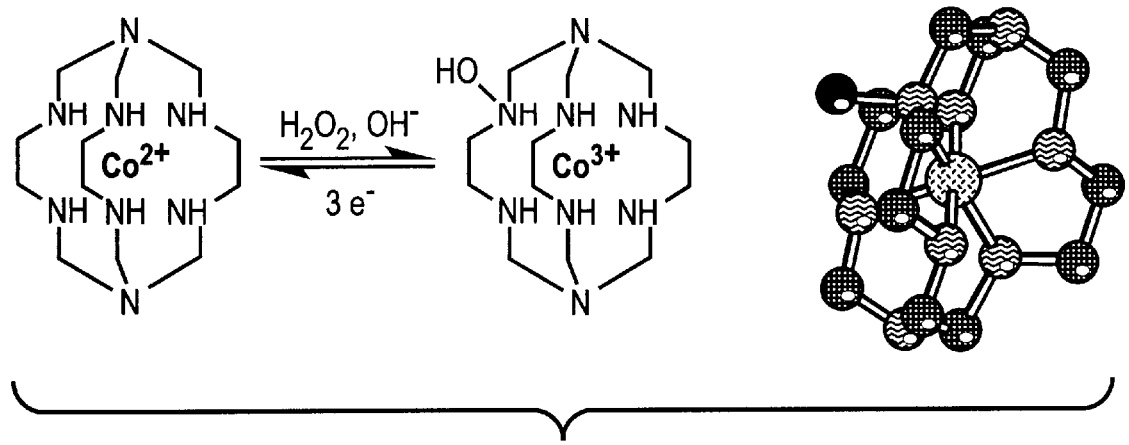
FIG. 6 illustrates a regeneration reaction by electrochemical reduction of a hydroxyl amine compound.
Figure 7:
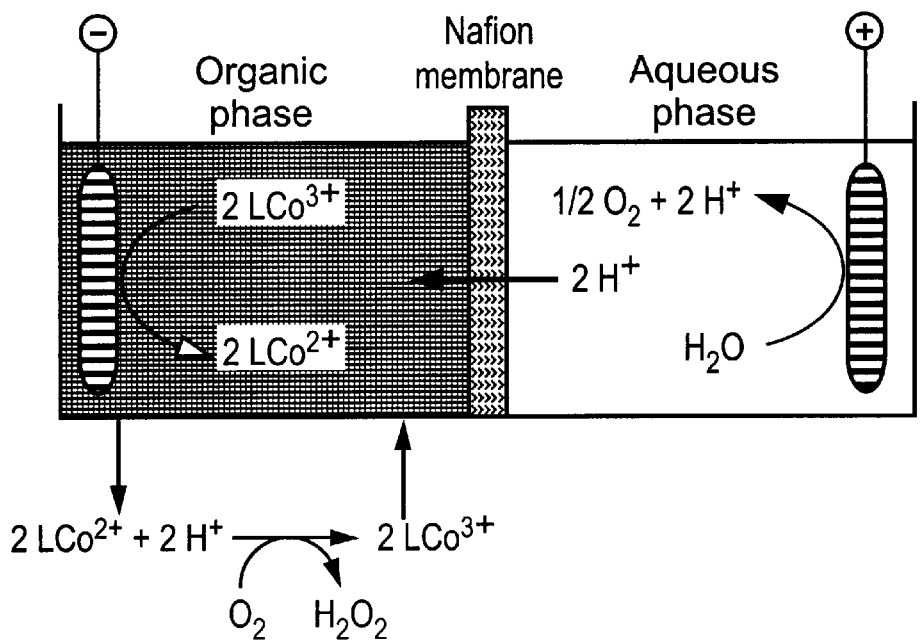
FIG. 7 illustrates the reaction mechanism in a two-compartment electrochemical cell.

A study of stability of the sepulchrate complex was carried out, and this compound was found to exhibit exceptional stability since no degradation is observed in highly acidic medium (12 M HCl) or highly basic medium (pH>12). Only the formation of a hydroxylamine function was revealed, when the complex is placed in the presence of concentrated hydrogen peroxide in strongly basic medium. However, this change is not problematic since it only takes place under conditions far from those which are used in the process. It is also possible to regenerate the starting sepulchrate complex by electrochemical reduction of the hydroxylamine compound, according to a three-electron process, as shown in FIG. 6.

c) Physicochemical Data for the Complexes [(SepN-OH)Co]Cl$_3$ Complex

| c) Physicochemical data for the complexes [(SepN-OH)Co]Cl$_3$ complex | | | | |
|---|---|---|---|---|
| Acidity constant | UV-visible spectroscopy (nm) [ε(mol$^{-1}$.l.cm$^{-1}$] | | Redox potentials E$_{1/2[\text{Co(III)/Co(II)}]}$ (V/SCE) | |
| (pKa) | HCl (0.1 M) | NaOH (0.1 M) | HCl (0.1 M) | NaOH (0.1 M) |
| 5.38 | 355 [141] 478 [124] | 339 [4786] 473 [111] | -0.585 | 0.883 |

Complexes (4) and (5)

A study of the lipophilic complexes by UV-visible spectroscopy and by measuring the redox potentials confirms that a change of anion and of solvent has no significant influence on their electronic properties.

| Complex | [(Sep)Co]Cl$_3$ | [(Sep)Co](B(Ph)$_4$)$_3$ | (Sep)Co] C$_{16}$H$_{33}$SO$_3$)$_3$ |
|---|---|---|---|
| Solvent | HCl (1 mol.l$^{-1}$) | CH$_2$Cl$_2$/DMF(1%) | CH$_2$Cl$_2$ |
| UV-visible characteristics (nm) [ε(mol$^{-1}$.l. | 344 (116) 474 (106) | 345 (232) 475 (127) | 346 (227) 477 (160) |

| | -continued | | |
|---|---|---|---|
| cm$^{-1}$)] | | | |
| $E_{1/2(LCo(III)/LCo(II))}$ (V/SCE) | -0.589 | -0.307 | -0.664 |

Since the extraction of the hydrogen peroxide is carried out with water, it is important to study the influence of water on the redox potentials of the complexes. The organic phases containing the lipophilic complexes were thus saturated with water and the cyclic voltammograms of these solutions were compared with the voltammograms obtained on anhydrous solutions. It turns out that the presence of water has little, if any, influence on the redox potentials of the two lipophilic complexes (4) and (5).

d) Activation of Dioxygen by the Complex Co(Sep)$^{2+}$ in Aqueous Phase

The reduction of dioxygen into hydrogen peroxide by the cobalt(II) complex takes place according to a mechanism involving two main steps (1) and (2) and in which one of the intermediates is a hydrogen superoxide molecule. The fact that step (2) is much faster than the excess of dioxygen in the reaction medium is thus not an interfering parameter. Furthermore, the reaction between the hydrogen peroxide formed and the complex molecules of cobalt in oxidation state +II which have not yet reacted with the dioxygen, turns out to be a side reaction for the process. It is thus necessary to have an $[O_2]/[H_2O_2]$ ratio which is as high as possible in order to minimize this interfering reaction.

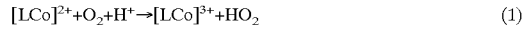   (1)
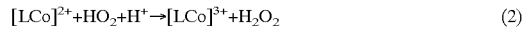   (2)
   (3)

After reduction of the cobalt(III) complex into cobalt(II) complex, the colourless solution once again turns orange after oxygenation. The hydrogen peroxide formed is then assayed by the titanium-based colorimetric method. It should be pointed out that, irrespective of the pH of the solution, the oxygenation reaction is instantaneous. When the pH of the solution before oxygenation is less than or equal to 7, the formation of hydrogen peroxide is virtually quantitative with a yield of greater than 95%, and the cobalt(III) complex is formed instantaneously. This result is confirmed by measuring the degree of oxygenation, which is also close to 100%. On the other hand, when the oxygenation of the solution is carried out at basic pH, the solution instantaneously turns orange, and a marked decrease in the hydrogen peroxide yield is observed. A lowering of the amount of hydrogen peroxide produced when the concentration of the complex is higher is also observed. This limitation of the yield can be attributed to the interfering oxidation reaction of the cobalt(II) complex by the hydrogen peroxide initially formed.

Figure 11:
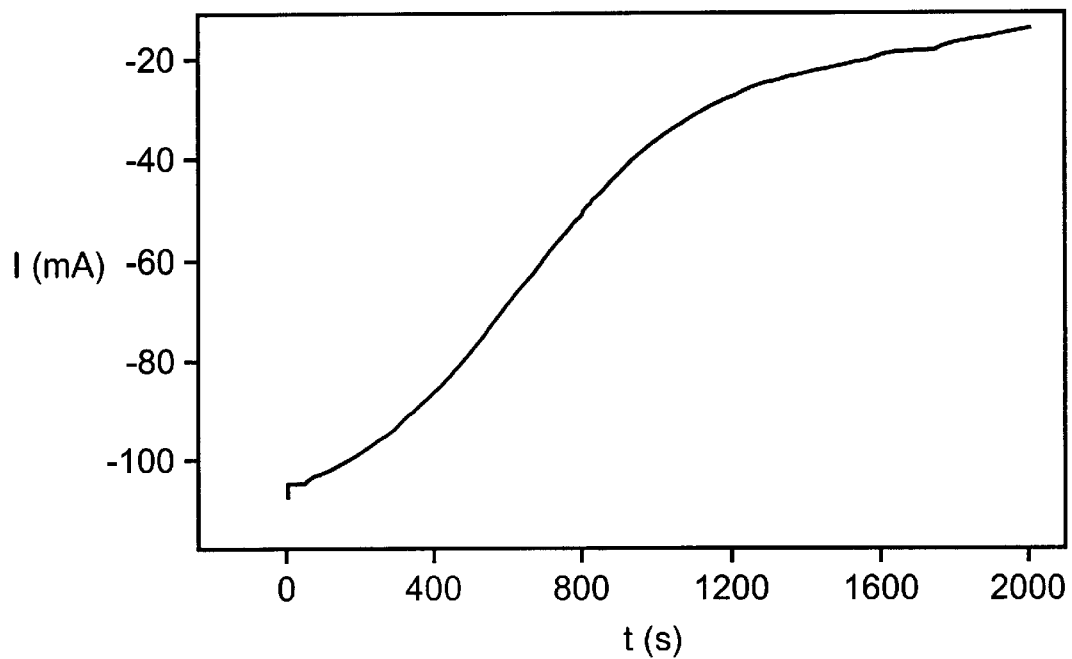
FIG. 11 illustrates an electrolysis curve for electrolysis of a complex under inert atmosphere.

B—Production of Hydrogen Peroxide with Two-Phase Separation of Liquid/Liquid Type B-1—Step of Generation/Regeneration of the Complex a) Choice of the Electrode Material Various electrode materials were tested with the [(Sep)Co]Cl$_3$ complex in water and with the [(Sep)Co](B(Ph)$_4$)$_3$ complex in dichloromethane. The results are given in the following table. The results show that the reduction of the [(Sep)Co]$^{3+}$ complex can, in principle, be carried out using several electrode materials, such as carbon, platinum, gold or nickel. However, during the electrolysis, since the cathodic compartment normally needs to be enriched with protons, an interfering reaction of formation of dihydrogen then risks taking place. Consequently, the choice of the electrode material must allow the complex to be reduced easily, while at the same time having the most remote hydrogen overvoltage possible. FIG. 11 shows the approximate potentials for the evolution of dihydrogen using different electrode materials. Tests carried out on the carbon electrode proved to be satisfactory and show that the evolution of hydrogen takes place at a more negative potential than that for the reduction of the complex, the latter being reduced quantitatively at -0.7 V after passage of one equivalent of electrons. All of the types of carbon tested (glass carbon, carbon graphite, crosslinked glass carbon and carbon felt) lead to relatively similar results and can be used.

TABLE

Study of the various materials

| Electrode material | Electrochemical reversibility | | Chemical reversibility | |
|---|---|---|---|---|
| | [(Sep)Co]Cl$_3$ | [(Sep)Co][B(Ph)$_4$] | [(Sep)Co]Cl$_3$ | [(Sep)Co][B(Ph)$_4$] |
| C graphite | yes | yes | | yes |
| Glass C | yes | yes | yes | yes |
| Ni | yes | yes | yes | yes |
| Pt | yes | yes | yes | yes |
| Au | yes | yes | yes | yes |
| Ti | no | no | no | no |
| Cu | no | no | no | no |
| Pb | no | no | no | no |
| Cd | no | no | no | no | b) Study of the Complex (5) in Organic Phase

Figure 12:
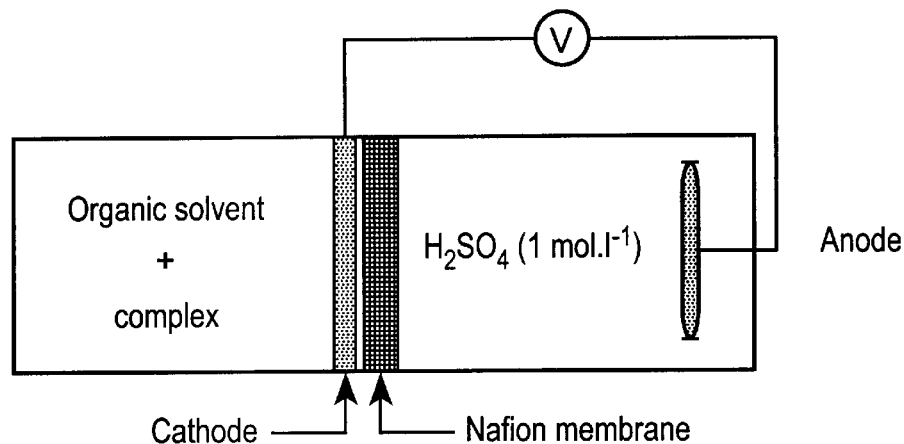
FIG. 12 is a diagram illustrating the electrolysis process.

The complex (5) was studied, the anion of which consists of a sulphonate group bearing a long carbon-based chain. This complex can be easily reduced on the carbon electrode. Tests show that this compound is stable and suffers no change when it is subjected to the action of heat or light. The base salt used for the electrolysis is sodium 1-hexadecanesulphonate. However, since this compound is relatively insoluble in dichloromethane, one equivalent of 15-C-5 crown ether had to be added to the medium in order to capture the Na$^+$ cation of the electrolyte, thus increasing its solubility. The electrolysis of complex (5) under inert atmosphere was thus carried out at a potential of -0.7 V, in the presence of one equivalent of dicyclohexyl 18-C-6 (Lehn J. M., La chimie macromoléculaire, De Boeck University edition, Paris Brussels, 1997). The electrolysis curve is represented in FIG. 12. After reduction of the complex, the medium, which had turned colourless, is oxygenated. The solution, which had turned orange, is then extracted with an aqueous phase, and the latter is then analysed: no trace of complex is detected and the pH, which remains neutral, indicates that the migration of the protons by electrolysis is effective. An assay makes it possible finally to reveal the formation of hydrogen peroxide, in a yield of 38%.

An analysis of the organic phase also showed that the lipophilic complex suffered no change.

c) Regeneration of the Active Complex in the Absence of Electrolyte

Figure 13:
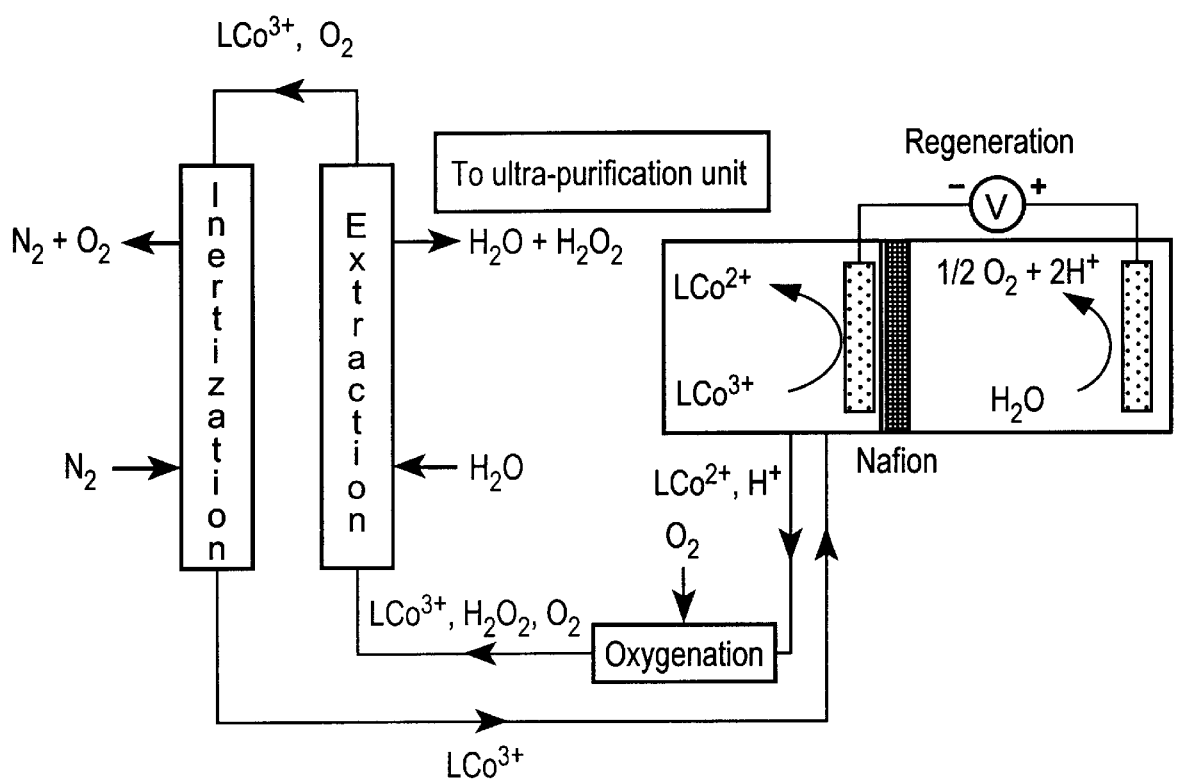
FIG. 13 illustrates an exemplary plant for the production of ultrapure hydrogen peroxide in accordance with the invention.

The principle of this electrolysis is represented in FIG. 13. The process consists in bringing the working electrode as close as possible to the separating membrane in order to obtain a minimal resistance between the two electrodes. The Nafion™ membrane then acts as a solid polymeric electrolyte (spe) and the transportation of material is ensured mainly by convection; it is thus necessary to circulate the solutions. The FM01-LC cell is adapted to this type of study since it makes it possible, in particular, to circulate the solutions in the two compartments and since it is possible to modify the distance between the cathode and the membrane. The tests carried out placing a carbon felt directly on the surface of the membrane lead to the formation of hydrogen peroxide.

d) Material Used

Figure 9A:
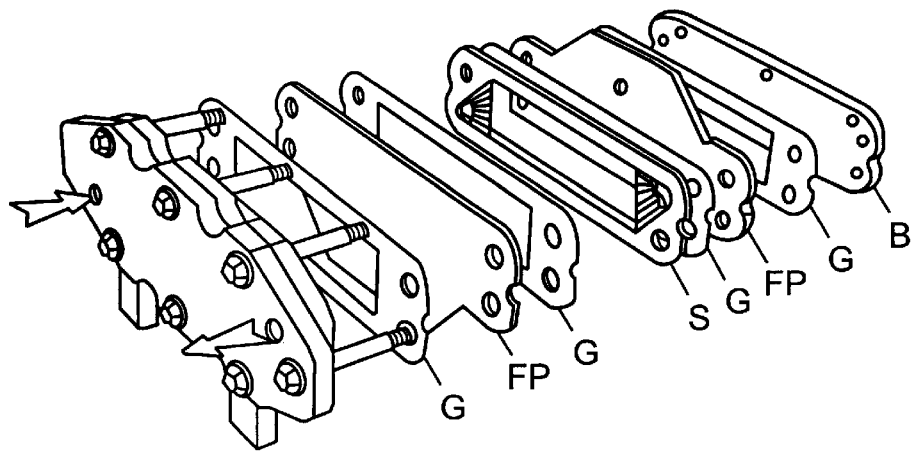
FIGS. 9a and b illustrate a filter-press type electrochemical cell.
Figure 9B:
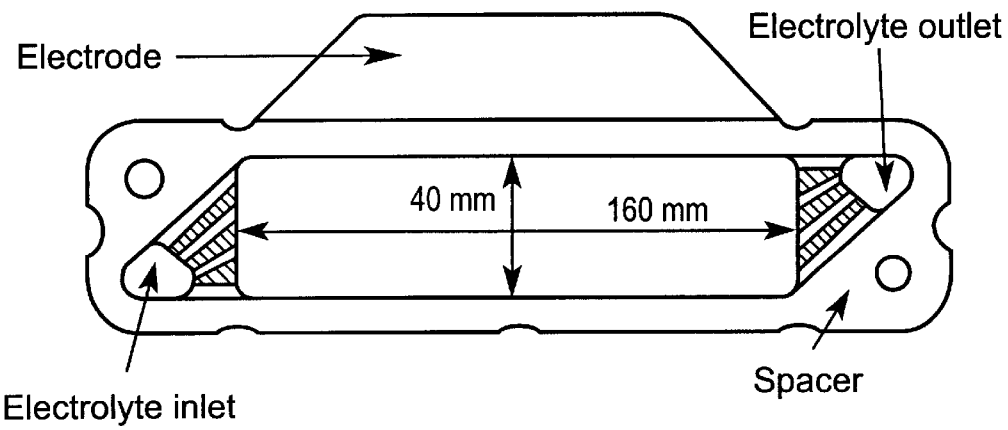

Two types of electrochemical cell were used during this study, each being advantageous in its own right. The first, represented in FIG. 9, is a conventional cell containing two compartments separated by a Nafion $_{417}$™ membrane. This glass cell, referred to as a "two-compartment cell", has the advantage of allowing the phenomena which may take place during the electrolyses to be clearly visualized, such as a change in colour or an evolution of gas; moreover, only small amounts of reagents are required.

Figure 10:
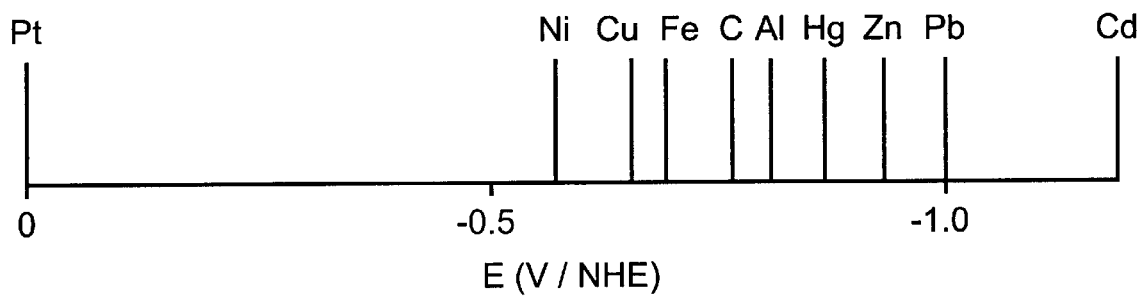
FIG. 10 illustrates approximate potentials for evolution of dihydrogen using different electrode materials.

The second cell used, represented in FIG. 10, is an electrolyser of "filter-press" type (Coeuret F. et al., Eléments de génie électrochimique, Tecdoc edn.; Paris, 1993), FM01-LC developed by the company ICI, which makes it possible to work in the laboratory under conditions very close to those used in industry, since it has characteristics,in particular as regards its geometry, which are very close to the industrial cells (Robinson D., Electrosynthesis, from Laboratory, to Pilot, to Production, J.D. Genders and D. Pletcher. edn.; 1990). These two cells thus have a complementary role, the two-compartment cell being used for analytical purposes and for fast experiments, and the FM01-LC electrolyser making it possible in particular to better understand the problems which will be posed during industrialization of the process.

B-2 Oxygenation Step

The formation of hydrogen peroxide also requires the supply of protons to the medium before oxygenation. It is thus necessary to find a technique for introducing the protons required for the formation of hydrogen peroxide without changing the solubility properties of the complex.

a) Use of an Inorganic Acid

Certain inorganic compounds are used as a source of protons in organic chemistry. Thus, an experiment identical to the one above was used, but introducing a clay of Montmorillonite $K_{10}$ type. This solid must, in fact, normally make it possible to supply the protons required for the reaction for the formation of hydrogen peroxide without destabilizing the complex. When the reaction is complete, this compound is isolated by simple filtration and then regenerated before being reintroduced into the medium to participate in a new cycle.

b) Use of an Organic Acid

The same experiment was carried out, introducing one equivalent of a lipophilic carboxylic acid, palmitic acid, into the reaction medium. After reduction of the complex and then oxygenation, the organic phase turns orange, proving that protons have been supplied. After extraction, the formation of hydrogen peroxide was revealed, in a yield of 41%.

c) Supply of Protons by Electrolysis Principle

Figure 8:
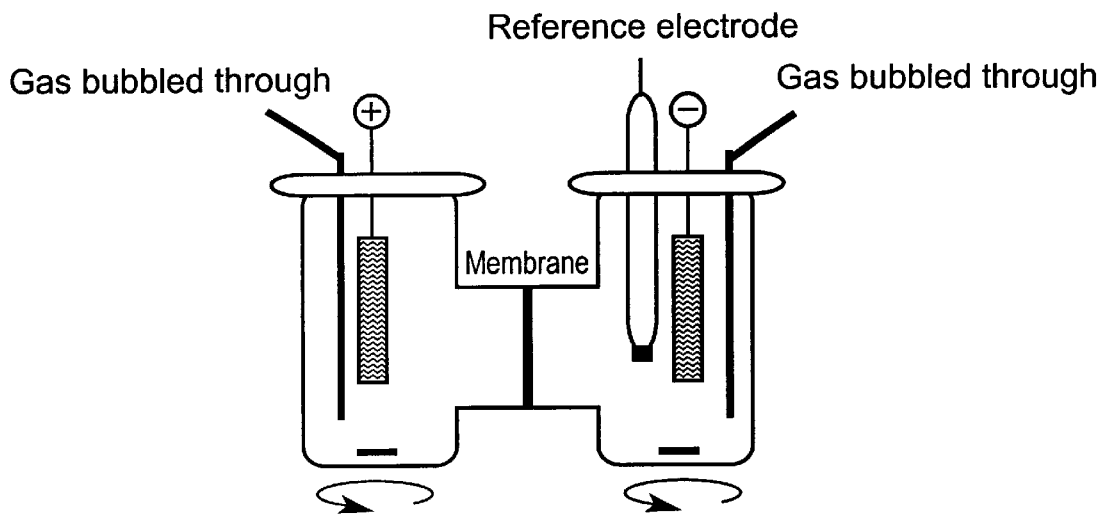
FIG. 8 illustrates a two-compartment electrochemical cell.

The polymer Nafion™ has the property of being totally impermeable to anionic species and of being permeable only to positively charged or neutral species (Hsu W. Y. et al., J. Membrane. Sc. 1983, 13, 307–326). It is thus possible, in principle, to supply the protons required for the formation of hydrogen peroxide by using the assembly illustrated in FIG. 8. While the cobalt(III) complex is conventionally reduced at the cathode, oxidation of water is carried out in the anodic compartment. The use of the cationic membrane allows the migration current to be provided only by the passage of the protons produced at the anode. After electrolysis, the solution containing the active complex and the protons required for the hydrogen peroxide formation reaction is oxygenated and then extracted; it can then participate in a new cycle.

B-3 Hydrogen Peroxide Production Unit

The assembly for producing and concentrating hydrogen peroxide is represented in FIG. 14. After reduction of the complex, the medium containing the protons is sent to the oxygenation compartment, in which the formation of hydrogen peroxide takes place. This hydrogen peroxide is isolated in the extraction compartment, in a second stage, and the medium containing the cobalt(III) complex is then inertized by bubbling nitrogen through. The cobalt(III) complex is finally reintroduced into the electrolysis cell in order to participate in a new cycle. The fact that the oxygenation and extraction compartments are separated makes it possible to use a fairly dilute working solution and then to enrich the aqueous phase with hydrogen peroxide progressively as the extractions proceed.

Finally, ultra-pure hydrogen peroxide is obtained after passage through a purification unit.

| B4 Tables summarizing the results B-1 Batchwise functioning | |
|---|---|
| Liquid phase 1 | (Sep)CoX$_3$ complex (10 mmol) in organic solution (CH$_2$Cl$_2$), with X = lipophilic anion (B(Ph)$_4$ or C$_{16}$H$_{33}$SO$_3$ |
| Liquid phase 2 | Pure water |
| Regeneration of the complex | Electrochemical reduction: carbon cathode, potential: –0.7 V/SCE |
| Supply of protons | Migration of the protons from the anodic compartment to the cathodic compartment Use of a cationic membrane (Nafion 417) Anodic oxidation of water Stabilization of the protons in the organic phase by using a crown ether |
| Stability of the complex | X = (B(Ph)$_4$: degradation X = C$_{16}$H$_{33}$SO$_3$: stable complex |
| Results | Yield of hydrogen peroxide: 41% (X = C$_{16}$H$_{33}$SO$_3$) |

-continued

| | B4 Tables summarizing the results<br>B-1 Batchwise functioning |
|---|---|
| Advantage of<br>the method | Non-polluting and well-controlled<br>reduction<br>Possibility of concentrating the<br>hydrogen peroxide |
| Problem | Formation of emulsions during the<br>extraction phase on account of the<br>presence of the electrolyte |
| Solutions to<br>the problem | Change of base salt<br>Electrolysis without base salt<br>(use of a solid polymeric<br>electrolyte, such as Nafion)<br>b) Continuous functioning |
| Liquid phase 1 | (Sep)CoX$_3$ complex (0.5 mmol) in<br>organic solution (CH$_2$Cl$_2$), with<br>X = lipophilic anion C$_{16}$H$_{33}$SO$_3$ |
| Liquid phase 2 | Pure water |
| Regeneration of<br>the complex | Electrochemical reduction: carbon<br>cathode, potential: −0.7 V/SCE |
| Supply of protons | Migration of the protons from the<br>anodic compartment to the cathodic<br>compartment<br>Use of a cationic membrane (Nafion ™<br>450)<br>Anodic oxidation of water<br>Stabilization of the protons in the<br>organic phase by using a crown ether |
| Stability of<br>the complex | X = C$_{16}$H$_{33}$SO$_3$: stable complex |
| Results | Faradic reaction yield: 10% |
| Advantages of<br>the method | Non-polluting and well-controlled<br>reduction<br>Very stable active complex<br>Electrolysis according to a<br>conventional electrochemical method<br>Possibility of concentrating the<br>hydrogen peroxide<br>The purity of the hydrogen peroxide<br>is adjustable according to<br>requirements |

In all the tests, it was possible to confirm that the aqueous hydrogen peroxide solution produced by the process which is the subject of the present invention contained none of the metal impurities which contaminate the solutions produced according to the anthraquinone process, i.e., in particular, aluminium, tin or iron ions. This process thus makes it possible to limit the number and nature of subsequent purification steps.

What is claimed is:

1. A process for preparing hydrogen peroxide, comprising:
   a) reducing dioxygen in an acidic medium with a hydrophobic organometallic complex, thereby forming hydrogen peroxide and an oxidized organometallic complex; and
   b) separating the oxidized organometallic complex resulting from step a) from the hydrogen peroxide by liquid/liquid extraction.

2. Process according to claim 1, wherein the organometallic complex is a complex of cobalt in oxidation state (+II).

3. Process according to claim 2, wherein a cobalt (+III) complex resulting from steps a) and b) is reduced into a cobalt (+II) complex.

4. Process according to claim 2, wherein the organic ligand in the organometallic complex is a polyazamacrocycle.

5. Process according to claim 4, wherein the organic ligand in the organometallic complex is a polyazabicyclo[6.6.6]eicosane.

6. Process according to claim 5, wherein the organic ligand in the organometallic complex is 1,3,6,8,10,13,16,19-octaazabicyclo[6.6.6]eicosane.

7. Process according to claim 4, wherein the cobalt (+III) complex resulting from steps a) and b) is reduced into a cobalt (+II) complex.

8. Process according to claim 1, wherein the organic ligand in the organometallic complex is a polyazamacrocycle.

9. Process according to claim 8, wherein the organic ligand in the organometallic complex is a polyazabicyclo[6.6.6]eicosane.

10. Process according to claim 9, wherein the organic ligand in the organometallic complex is 1,3,6,8,10,13,16,19-octaazabicyclo[6.6.6]eicosane.

11. Process for preparing hydrogen peroxide according to claim 1, further comprising:
   c) regenerating the active organometallic complex by electrochemical reduction, wherein the regenerated active organometallic complex is reused in step a).

\* \* \* \* \*